(No Model.)
L. M. DEVORE.
TOOL HANDLE.
No. 330,383. Patented Nov. 17, 1885.
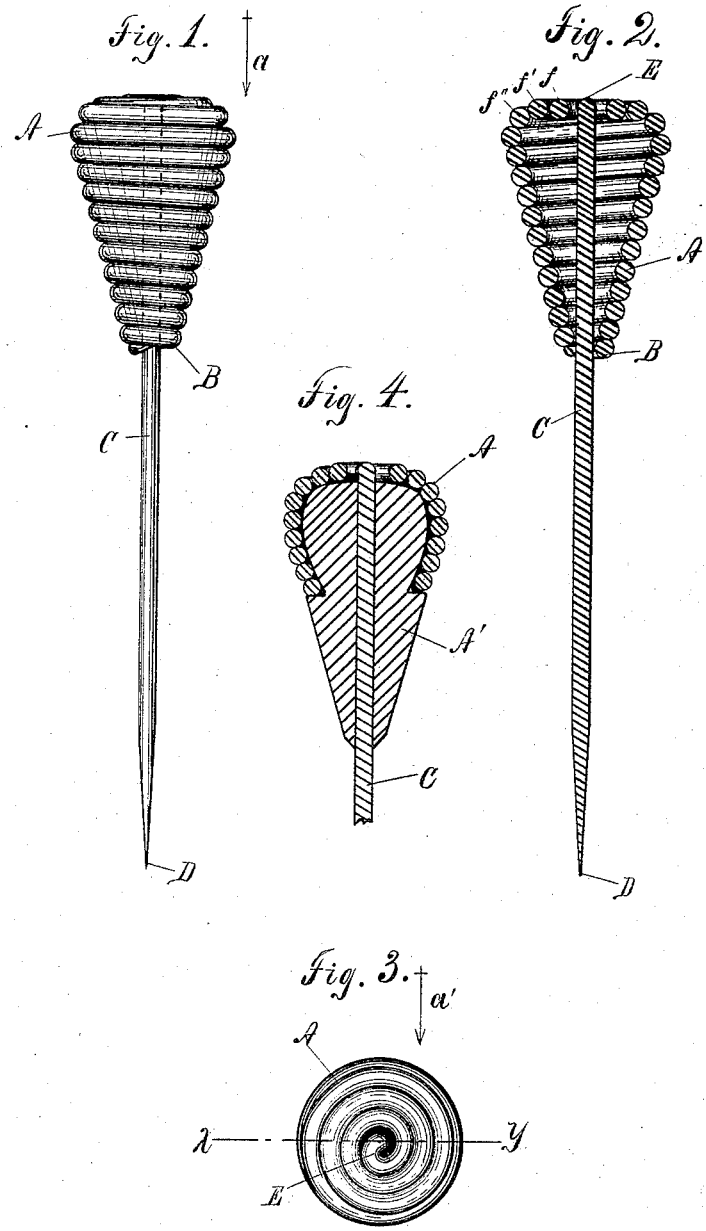
WITNESSES:
INVENTOR

UNITED STATES PATENT OFFICE.

LEVI M. DEVORE, OF FREEPORT, ILLINOIS.

TOOL-HANDLE.

SPECIFICATION forming part of Letters Patent No. 330,383, dated November 17, 1885.

Application filed May 29, 1885. Serial No. 167,046. (No model.)

*To all whom it may concern:*

Be it known that I, LEVI M. DEVORE, a resident of Freeport, in the county of Stephenson and State of Illinois, have invented certain new and useful Improvements in Tools; and I do hereby declare the following to be a full, clear, and exact description of the invention, such as will enable others skilled in the art to which it pertains to make and use the same.

My invention relates to improvements in awls and other carpenters' tools of the same general class, consisting, in substance, of a shank and handle attached thereto.

The invention is described and claimed in this specification, and shown in the accompanying drawings, in which—

Figure 1 is a side elevation of an awl embodying my invention; Fig. 2, a central vertical section of same through the line $x\,y$, Fig. 3; Fig. 3, a top plan of same, and Fig. 4 a central section of a modified form of the invention.

In these views, A B is the handle, and C the shank, of an awl formed of a single continuous rod or wire, the handle being formed of a number of coils of the wire coiled about the shank in any desired form. In the form shown in Figs. 1, 2, 3, the straight shank C, having the point D, is terminated at the top in a bend, E, at right angles, or nearly at right angles, to the shank itself. From this bend the wire or rod is coiled in spirals of any desired number and relative position to form a handle; but the better form is that shown in which the rod is first wound in a series of nearly flat coils, $f\,f'\,f''$, increasing in diameter from the center outward, and then in a series of coils one below the other, and gradually decreasing in size to form a cone, the last coil, B, being wound closely about the shank. This form has the advantages of being convenient for working, and of affording two points of connection of the shank and handle—one at the top and the other at the bottom of the handle. At the same time, however, that this is a desirable form, the form is not material, and in some cases a cylindrical handle is preferable to the cone shown in these figures.

It is preferable to run the shank of the tool through the center of the handle, making the point of junction of the two parts at the top of the handle, as shown; but it is evident that the shank may begin at the bottom of the handle and extend thence downward, instead of passing through the length of the handle. In other words, referring to the drawings, the shank, instead of being the continuation of the coil $f$, may be the downward continuation of the coil B.

In Fig. 4 is shown a slightly modified form, in which the shank C extends through the handle, the upper part of which is composed of coils A integral with the shank, and having preferably the same form as the upper part of the handle shown in Figs. 1, 2. The lower part of the handle shown in Figs. 1, 2 is, however, omitted from the form shown in this figure, the place thereof being taken by a wooden core, A', recessed above to receive the coils A, and cone-shaped below. The coils A decrease slightly in size from the top downward, and the upper part of the core A' springs the lower coils slightly as it is pushed into place from below.

I do not intend to limit my invention to its use in tools which consist only of a shank and a handle—such as awls, screw-drivers, chisels, &c.—but to cover its application to such tools as require the mounting of a head on the shank—as, for instance, tack-hammers and other similar tools—as well as to such other uses as the combined shank and handle (or knob) may be adapted to.

Having now described and explained my invention, what I claim as new, and desire to secure by Letters Patent, is—

1. A shank and handle formed of a single continuous rod or wire, the top or outer end of the handle being a series of approximately flat coils increasing in diameter from the shank outward, and the lower part of the handle being approximately conical, and consisting of a series of coils decreasing in diameter from the last of said flat coils downward and inward toward the shank.

2. The tool shown and described, consisting of the shank C, the approximately flat coils $f\ f'\ f''$, the coils A, decreasing in diameter from the top downward, and the coil B, wrapped closely about the shank, all formed integrally with the shank, substantially as shown and described, and for the purpose set forth.

In testimony whereof I have signed this specification in the presence of two subscribing witnesses.

LEVI M. DEVORE.

Witnesses:
M. STOSKOPF,
LEONARD STOSKOPF.